United States Patent
Harma

(10) Patent No.: US 9,743,211 B2
(45) Date of Patent: Aug. 22, 2017

(54) METHOD AND APPARATUS FOR DETERMINING A POSITION OF A MICROPHONE

(71) Applicant: KONINKLIJKE PHILIPS N.V., Eindhoven (NL)

(72) Inventor: Aki Sakari Harma, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 141 days.

(21) Appl. No.: 14/775,058

(22) PCT Filed: Mar. 18, 2014

(86) PCT No.: PCT/IB2014/059916
§ 371 (c)(1),
(2) Date: Sep. 11, 2015

(87) PCT Pub. No.: WO2014/147551
PCT Pub. Date: Sep. 25, 2014

(65) Prior Publication Data
US 2016/0029141 A1    Jan. 28, 2016

Related U.S. Application Data

(60) Provisional application No. 61/803,192, filed on Mar. 19, 2013.

(51) Int. Cl.
*H04S 7/00* (2006.01)
*G01S 5/28* (2006.01)

(52) U.S. Cl.
CPC ............... *H04S 7/301* (2013.01); *G01S 5/28* (2013.01); *H04S 2400/01* (2013.01); *H04S 2400/11* (2013.01)

(58) Field of Classification Search
CPC combination set(s) only.
See application file for complete search history.

(56) References Cited

U.S. PATENT DOCUMENTS 5,666,424 A * 9/1997 Fosgate ................... H04S 5/005
381/104
7,016,501 B1 * 3/2006 Aylward ................... H04R 5/04
381/22

(Continued)

FOREIGN PATENT DOCUMENTS

WO    2006131893 A1    12/2006
WO    2007068257 A1    6/2007

(Continued)

OTHER PUBLICATIONS

ITU-R BS.775.1, Recommendation "Multichannel Stereophonic Sound System With and Without Accompanying Picture", 1992-1994, p. 1-10.

*Primary Examiner* — Duc Nguyen
*Assistant Examiner* — Assad Mohammed

(57) ABSTRACT

An apparatus comprises a receiver (203) receiving a multichannel signal comprising two channels for rendering by a first speaker (101) at a first position and a second speaker (103) at a second position respectively. A first signal generator (207) generates a correlated signal and a second signal generator (209) generates an uncorrelated signal from the multichannel signal, the signals comprising respectively correlated and uncorrelated signal components for the channels. A receiver (201) receives a microphone signal from the microphone (107). A first correlator (213) determines a first correlation signal from a correlation of the microphone signal and the correlated signal, and a second correlator (215) determines a second correlation signal from a correlation of the microphone signal and the uncorrelated signal. A position estimator (219) estimates a position of the (Continued)

microphone from the first and second correlation signals. For example, timings of peaks in the correlations signals may be used to determine propagation delays and thus distances from the speakers (101, 103).

15 Claims, 6 Drawing Sheets

(56) References Cited

U.S. PATENT DOCUMENTS

| | | | | |
|---|---|---|---|---|
| 7,630,501 B2* | 12/2009 | Blank | .................... | H04S 7/301 381/300 |
| 7,949,139 B2* | 5/2011 | McKee Cooper | ...... | G01S 11/14 381/58 |
| 2002/0167862 A1* | 11/2002 | Tomasi | .................... | G01S 5/18 367/118 |
| 2005/0237186 A1* | 10/2005 | Fisher | .................... | F41H 11/00 340/539.22 |
| 2006/0100809 A1* | 5/2006 | Yoneda | .................... | G01H 5/00 702/109 |
| 2006/0140414 A1* | 6/2006 | Higashihara | ........... | H04R 29/00 381/59 |
| 2007/0058820 A1* | 3/2007 | Sawara | .................... | H04R 27/00 381/82 |
| 2009/0028358 A1* | 1/2009 | Suzuki | .................... | H04R 1/403 381/97 |
| 2010/0226210 A1* | 9/2010 | Kordis | .................... | G01S 5/0027 367/127 |
| 2011/0103191 A1* | 5/2011 | Shin | .................... | G01S 3/8083 367/125 |
| 2012/0069714 A1 | 3/2012 | Nakadai et al. | | |
| 2014/0119552 A1* | 5/2014 | Beaucoup | ............. | H04M 9/082 381/66 |

FOREIGN PATENT DOCUMENTS

| | | |
|---|---|---|
| WO | 2012076331 A1 | 6/2012 |
| WO | 2012146658 A1 | 11/2012 |
| WO | 2013111034 A2 | 8/2013 |

* cited by examiner

METHOD AND APPARATUS FOR DETERMINING A POSITION OF A MICROPHONE

CROSS-REFERENCE TO PRIOR APPLICATIONS

This application is the U.S. National Phase application under 35 U.S.C. §371 of International Application No. PCT/IB2014/059916, filed on Mar. 18, 2014, which claims the benefit of U.S. Provisional Application 61/803,192, filed on Mar. 19, 2013. These applications are hereby incorporated by reference herein.

FIELD OF THE INVENTION

The invention relates to a method and apparatus for determining a position of a microphone, and in particular, but not exclusively, for determining a position of a microphone as part of a speaker calibration operation.

BACKGROUND OF THE INVENTION

In recent decades, the variety and flexibility of audio applications has increased immensely with e.g. the variety of audio and capture rendering applications varying substantially. The audio rendering and capture setups are used in diverse acoustic environments and for many different applications.

In many applications it is therefore desirable to be possible to determine the position of a microphone, a listening position or a loudspeaker relative to other loudspeakers. In many applications these issues may be reduced to the same underlying problem, namely that of determining a position of a microphone.

Indeed, in many applications, a listening position may be determined by calibrating the system using a microphone which is positioned at the listening position. Similarly, speaker positions may be determined by positioning a microphone at a speaker position, or perhaps by permanently implementing a microphone in a loudspeaker. A particularly important challenge in many applications is that of determining loudspeaker positions for a rendering setup, such as for a surround sound system.

Indeed, a significant inconvenience perceived by consumers when using e.g. home cinema surround sound is the need for a relatively large number of speakers to be positioned at specific positions. Typically, practical surround sound speaker setups will deviate from the ideal setup due to users finding it impractical to position the speakers at the optimal positions. Therefore, real setups may deviate substantially from the ideal setup, and accordingly procedures for calibrating the rendering systems and compensating for imperfections have been developed. Flexible systems based on speaker calibration have been developed to provide flexible setups where users may position speakers relatively freely at convenient positions with the system automatically adjusting the audio processing and rendering to the specific setup.

Such systems may be based on determining the relative positions of the speakers. For example, WO 2006/131893-A1 discloses an automatic calibration of a multichannel system based on a system where each loudspeaker is equipped with a microphone to allow impulse responses to be determined from each pair-wise loudspeaker combination. This information is then used to determine the relative locations of the loudspeakers. An optimization procedure is then used to distribute the multi-channel audio signals such that an optimum listening experience, as defined in the ITU-R BS.775-1 recommendations, is obtained at a specified listening position. In U.S. Pat. No. 5,666,424-A, a calibration procedure using a microphone at the listening position is performed to determine the relative distance from each loudspeaker to the listening position.

Existing rendering calibrations are mostly based on a loudspeaker rendering a specific test or probe signal, such as noise sequences or chirp sounds, with the resulting signals being captured by a microphone. The calibration of such systems may take several seconds. More importantly, the process relies on specific audio test signals and therefore cannot be performed during the normal operation of the audio system, such as during music playback.

However, it is desirable to be able to determine positions during normal use of a rendering system, such as during music rendering. This may typically provide an improved determination which allows a continuous adaptation of the system. For example, the system may automatically adapt to a user moving a speaker during play-back. This may be particularly significant in many current and future systems using portable and fully wireless battery-powered loudspeakers which are becoming increasingly popular.

However, normal audio tends to vary substantially with the specific instantaneous properties being unpredictable. Therefore, position estimation based on such signals tend to often result in relatively unreliable estimates. Furthermore, the signals from different loudspeakers tend to be different from each other, but with the difference at any given time being unknown.

Hence, an improved approach for determining a position of a microphone would be advantageous and in particular an approach allowing for increased flexibility, automatic determination, reduced reliance on specific test signals, improved estimation accuracy and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for determining a position of a microphone, the apparatus comprising: a multi-channel signal receiver for receiving a multichannel signal comprising at least a first channel for rendering by a first speaker at a first position and a second channel for rendering by a second speaker at a second position; a first signal generator for generating a first correlated signal from the multichannel signal, the first correlated signal comprising correlated signal components for the first channel and the second channel; a second signal generator for generating a first uncorrelated signal from the multichannel signal, the first uncorrelated signal comprising signal components of the first channel not correlated with signal components of the second channel; a microphone signal receiver for receiving a microphone signal from the microphone; a first correlator for determining a first correlation signal from a correlation of the microphone signal and the first correlated signal; a second correlator for determining a second correlation signal from a correlation of the microphone signal and the first uncorrelated signal; and a position estimator for estimating the position of the microphone in response to the first correlation signal and the second correlation signal.

The invention may allow improved and/or facilitated determination of a position of a microphone in many scenarios and applications. The approach may allow position determination without requiring specific test signals, and may in many scenarios allow a determination of a position of a microphone based on measurements of audio rendering during normal operation, such as during rendering of audio corresponding to music or soundtracks.

The microphone position may be related to a listening position or a speaker position. Specifically, the apparatus may in some embodiments be arranged to perform an audio system calibration in response to the determined position, and may in particular perform such a calibration based on an assumption of the microphone position corresponding to a listening position or a speaker position.

The correlation signal may be generated to provide a correlation value for different time offsets between the signals of the correlation The correlation signal may be a correlation function generated to provide a correlation value for different time offsets between the signals used to compute the function. Thus, first correlation signal may provide a correlation value as a function of time where the correlation value for a given time instant corresponds to the correlation between the microphone signal and the first correlated signal for a time offset corresponding to that time instant. Similarly, the second correlation signal may provide a correlation value as a function of time where the correlation value for a given time instant corresponds to the correlation between the microphone signal and the first uncorrelated signal for a time offset corresponding to that time instant. The correlation signals may be specifically be cross-correlations between pairs of signals.

The first and second correlation signals may reflect impulse responses for the acoustic transfer functions from the first speaker and the second speaker to the microphone.

In some embodiments, the position estimator may determine the position in response to amplitudes of the first correlation signal and the second correlation signal at times corresponding to different propagation delays from the first and second speaker.

In some embodiments, the position estimator may determine the position in response to timings of peaks in the first correlation signal and in the second correlation signal. A peak may be a local maximum of the correlation signal (typically with a suitable filtering or averaging).

In accordance with an optional feature of the invention, the apparatus further comprises: a third signal generator for generating a second uncorrelated signal from the multichannel signal, the second uncorrelated signal comprising signal components of the second channel not correlated with signal components of the first channel; a third correlator for determining a third correlation signal from a correlation of the microphone signal and the second uncorrelated signal; and wherein the position estimator is arranged to estimate the position of the microphone further in response to the third correlation signal.

This may provide improved position estimation in many embodiments and may result in improved accuracy of the generated position estimate, and thus improved accuracy of associated operations, such as an audio rendering system calibration.

In accordance with an optional feature of the invention, the position estimator comprises: a first estimator for generating a first arrival time estimate and a second arrival time estimate for sound from the first speaker and the second speaker to the microphone in response to the first correlation signal; a second estimator for generating a third arrival time estimate for sound from the first speaker to the microphone in response to the first uncorrelated signal; and wherein the position estimator is arranged to estimate the position of the microphone in response to the first arrival time estimate, the second arrival time estimate and the third arrival time estimate.

This may provide improved and or facilitated position estimation in many embodiments.

The first and second arrival time estimates may correspond to propagation delays from the first and second speakers to the position/microphone. However, it may not be known whether the first arrival time estimate corresponds to the first speaker or the second speaker, and similarly for the second arrival time estimate. The third arrival time estimate may correspond to a propagation delay from the first speaker to the position/microphone.

The third arrival time estimate may provide a further estimate for the propagation delay from the first speaker to the position in addition to an estimate based on either one of the first and second arrival time estimates. The approach may thus provide multiple estimates of the time of arrival/propagation delay thereby allowing improved accuracy.

In some embodiments, a third estimator may generate a fourth arrival time estimate for sound from the second speaker to the microphone in response to the second uncorrelated signal, and the position estimator may further determine the position in response to the fourth arrival time estimate.

In accordance with an optional feature of the invention, the position estimator is arranged to assign the first arrival time estimate to one of the first speaker and the second speaker in response to the third arrival time estimate.

This may allow efficient and reliable position determination. Specifically, it may be unknown which of the first arrival time estimate and the second arrival time estimate corresponds to the sound from the first speaker and which corresponds to the sound from the second speaker. This ambiguity and uncertainty may be resolved based on the third arrival time estimate which is known to belong to the first speaker.

As an example, the arrival time estimate of the first arrival time estimate and the second arrival time estimate which is closest to the third arrival time estimate may be considered to correspond to the first speaker with the other being considered to correspond to the second speaker.

Specifically, the position estimator may be arranged to assign the second arrival time estimate to one of the first speaker and the second speaker to which the first arrival time estimate is not assigned. Thus, the first and second arrival time estimate may be assigned to the first and second speakers as appropriate based on the third arrival time estimate.

In accordance with an optional feature of the invention, the position estimator is arranged to determine a combined arrival time estimate for sound of the first speaker from the third arrival time estimate and one of the first arrival time estimate and the second arrival time estimate, and to determine the position of the microphone to have a distance from the first speaker corresponding to the combined arrival time.

This may provide facilitated operation and/or improved performance in many scenarios.

The selected one of the first and second arrival time estimates may specifically be the estimate closest to the third arrival time estimate.

In accordance with an optional feature of the invention, a relative weighting of the third arrival time and the one of the first arrival time estimate and the second arrival time estimate in generating the combined arrival time estimate depends on at least one of a correlation level estimate and a correlation noise estimate for at least one of the first correlation and the second correlation.

This may provide improved position estimation in many scenarios, and may in particular provide an improved adaptation to the specific characteristics of the rendered audio. It may specifically allow the position estimation to be adapted in dependence on how similar or different the signals of the two channels are. The approach may provide improved signal-to-noise ratios for the determination and may lead to reduced noise/uncertainty of the resulting position estimate.

In accordance with an optional feature of the invention, the first estimator is arranged to detect a first peak and a second peak in the first correlation signal and to determine the first time of arrival estimate in response to a timing of the first peak and to determine the second time of arrival estimate in response to a timing of the second peak.

This may provide facilitated operation and/or improved estimates. The peak detection may be a detection of a local maximum in the correlation signal, e.g. after a suitable filtering.

In accordance with an optional feature of the invention, the first estimator is arranged to perform a peak detection to detect a peak in the first correlation signal and to determine the first time of arrival estimate in response to a timing of the peak, wherein the peak detection is dependent on the second correlation signal.

This may provide facilitated operation and/or improved estimates. The peak detection may be a detection of a local maximum in the correlation signal, e.g. after a suitable filtering. The peak detection may for example be adjusted by selecting a time interval in which to detect the peak in the first correlation signal based on a timing of a peak in the third correlation signal.

In accordance with an optional feature of the invention, the position estimator is arranged to weigh the first correlation signal relative to the second correlation signal in response to at least one of: a power measure of the first correlation signal relative to a power measure of the second correlation signal; and a power measure for the first correlated signal relative to a measure level of the first uncorrelated signal.

This may provide improved position estimation in many scenarios and may in particular provide an improved adaptation to the specific characteristics of the rendered audio. Specifically, it may allow the position estimation to be adapted depending on how similar or different the signals of the two channels are. The approach may provide improved signal-to-noise ratios for the determination resulting in reduced noise/uncertainty of the resulting position estimate.

The relative power level(s) may for example be measured in a time interval, such as e.g. a time interval around a local maximum.

In accordance with an optional feature of the invention, the position estimator is arranged to determine a probability of the position being in a region in response to at least one of a property of the first correlation signal in a first time interval and a property of the second correlation signal in a second time interval, the first and second time intervals corresponding to a sound propagation delay for sound from the first speaker to the region.

This may provide a particularly advantageous position determination, and specifically may provide additional position information.

In some embodiments, the position estimator may be arranged to determine probabilities for a plurality of regions. A position of the microphone may e.g. in some embodiments be selected as a position of the region having the highest probability. In some embodiments, a probability map may be determined for an area by dividing this into a plurality of regions and determining a probability for each region.

In accordance with an optional feature of the invention, the property is a signal level measure.

This may provide particularly advantageous position determination in many embodiments.

The signal level measure may be an absolute or relative signal level measure.

In accordance with an optional feature of the invention, the apparatus further comprises: a divider which is arranged to divide a first channel signal of the first channel into a plurality of time-frequency intervals; a correlation estimator for generating a correlation measure for the first channel signal of the first channel and a second channel signal of the second channel for each time-frequency interval of the plurality of time-frequency intervals; and wherein the first signal generator is arranged to generate the first correlated signal by for each time frequency interval weighting a signal value of the first channel signal for the time frequency interval by a weight being a monotonically increasing function of the correlation measure for the time-frequency interval.

This may provide a particularly advantageous approach for generating the correlated signal. In particular, it may provide an efficient separation of sound components that are highly correlated between channels and sound components that are not highly correlated.

In accordance with an optional feature of the invention, the second signal generator is arranged to generate the first uncorrelated signal by for each time frequency interval weighting a signal value of the first channel signal for the time frequency interval by a weight being a monotonically decreasing function of the correlation measure for the time-frequency interval.

This may provide a particularly advantageous approach for generating the first uncorrelated signal. In particular, it may provide an efficient separation of sound components that are highly correlated between channels and sound components that are not highly correlated.

According to an aspect of the invention there is provided a method of determining a position of a microphone, the method comprising: receiving a multichannel signal comprising at least a first channel for rendering by a first speaker at a first position and a second channel for rendering by a second speaker at a second position; generating a first correlated signal from the multichannel signal, the first correlated signal comprising correlated signal components for the first channel and the second channel; generating a first uncorrelated signal from the multichannel signal, the first uncorrelated signal comprising signal components of the first channel not correlated with signal components of the second channel; receiving a microphone signal from the microphone; determining a first correlation signal from a correlation of the microphone signal and the first correlated signal; determining a second correlation signal from a correlation of the microphone signal and the first uncorrelated signal; and estimating the position of the microphone in response to the first correlation signal and the second correlation signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a system for determining positions of a microphone for use in a calibration of a spatial audio rendering system. However, it will be appreciated that the invention is not limited to this application but may be applied to many other applications.

Figure 1:
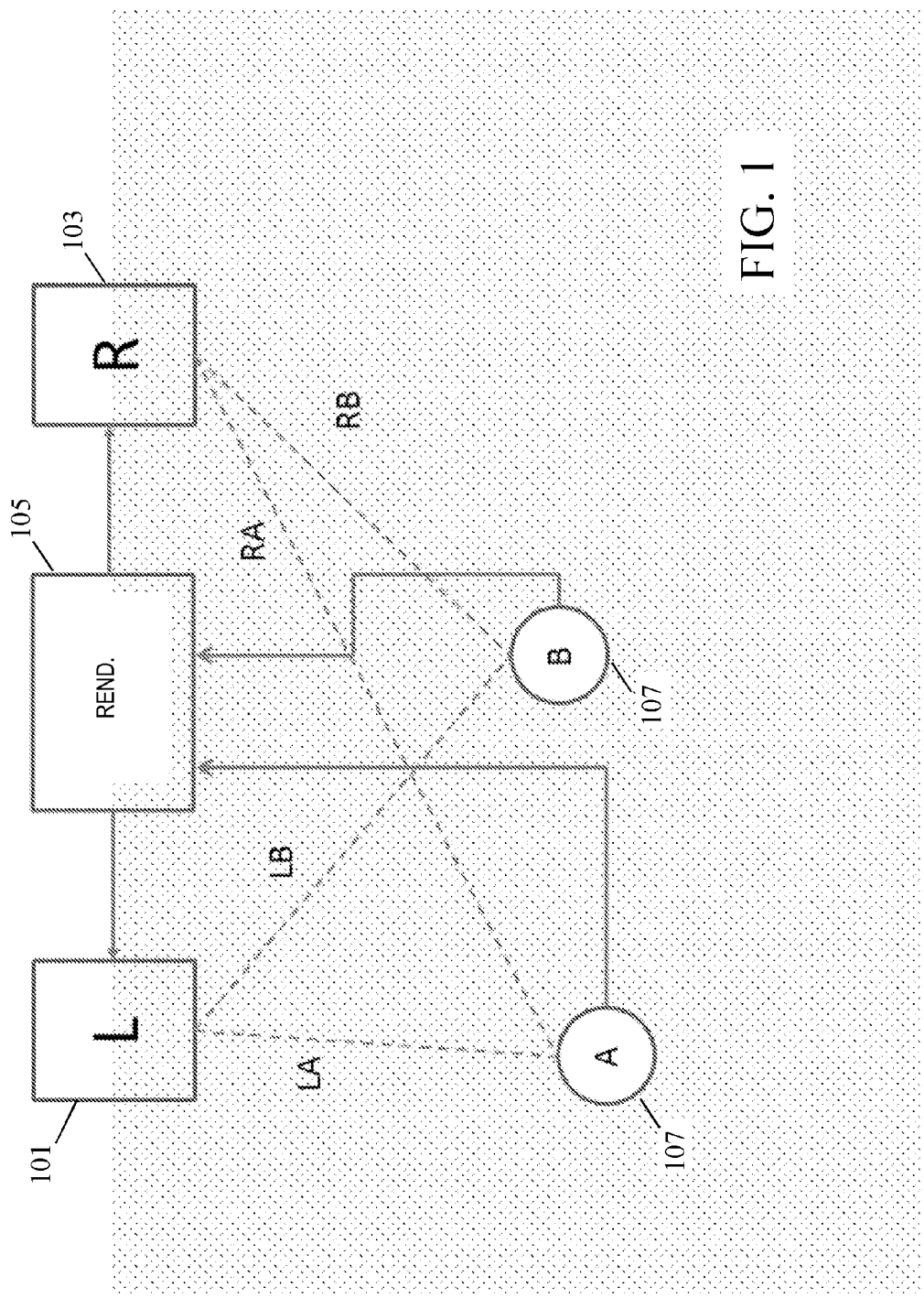
FIG. 1 is an illustration of a sound rendering system in accordance with some embodiments of the invention.

The following description will focus on a sound rendering arrangement as illustrated in FIG. 1. In the example, the sound rendering arrangement comprises first and second loudspeakers 101, 103. In the specific example, the first and second speakers 101, 103 are speakers of a stereo rendering system, and will also be referred as the left and right speaker respectively.

In the specific example, the system is a two channel (stereo) rendering system. However, it will be appreciated that in other embodiments the system may be a multi-channel system comprising more than two channels. Specifically, the first and second speaker 101, 103 may be two speakers of a surround sound system comprising e.g. 5 or 7 spatial speakers, such as the front right and left speakers.

The first and second speakers 101, 103 are coupled to a sound renderer 105 which is arranged to generate drive signals for the speakers 101, 103. The rendering system may for example be used for playing music, providing the sound track for e.g. a television, film etc. In some embodiments, the rendering system may be a surround sound system comprising more than the first and second speakers 101, 103. For example, the rendering system may provide a full 5.1 or 7.1 surround sound experiences using the first and second speakers 101, 103 for two of the spatial channels, and specifically for the front left and right channels.

In order to optimize the sound rendering, it is desirable to calibrate/adapt the system to the specific rendering characteristics. In many scenarios, it is desirable to determine particular positions, such as positions of speakers or a position of a listening zone. In some systems, such positions may be determined using a microphone. Thus, the microphone may be positioned at a position which is desired to be known. E.g. the microphone may be positioned at a typical listening position, or may be co-located with a speaker (such as a rear surround speaker). The position of the microphone may then be determined, e.g. relative to the position of a specific speaker, and the determined position can be used in the rendering system calibration.

In the system of FIG. 1, the sound renderer 105 comprises a microphone input to which an external microphone 107 can be coupled. Based on the received microphone signal, the sound renderer 105 is capable of determining a position of the microphone 107 relative to the first and second speakers 101, 103. The determined microphone position may then be used as the position of e.g. another speaker or of the listening position. For example, the user may first position the microphone 107 at the position of a rear speaker (denoted as position A in FIG. 1). The position may then be determined and used as the position for the rear speaker. The user may then move the microphone to the listening position (denoted as position B in FIG. 2) and the position may be determined and used as the position of the listener. In other embodiments, a plurality of microphones and inputs may be used. For example, microphones may continuously be positioned at a preferred listening position (which may change) and integrated with the rear speakers. The sound renderer 105 may then continuously and simultaneously determine current positions for the rear speakers and the listener, and may dynamically update the rendering in response.

Most rendering systems which comprise functionality for determining a position of a microphone, e.g. for calibration of the system, utilize specific test signals that are rendered through the speakers of the system. The microphone then detects these test signals and the corresponding captured signal is used to determine the position. However, this is suboptimal as it prevents the determination to be performed during normal operation.

The system of FIG. 1 is arranged to determine the position of the microphone 107 but does not necessitate dedicated test signals. Rather it allows the position of a microphone to be determined during normal rendering operation. The position determination is performed using the normal rendered sound, such as e.g. music or a movie sound track. The approach may not only provide reduced inconvenience to the user as the need for specific calibration/test procedures can be obviated, but may also allow improved and continuous adaptation of the system during operation.

The sound renderer 105 of FIG. 1 specifically comprises a position estimation unit which is arranged to estimate the position of the microphone 107 (or positions of microphones in embodiments and scenarios where a plurality of microphones is used simultaneously). The position estimation unit is arranged to determine the position based on the captured sound signals from the loudspeakers, and specifically it can determine the position based on e.g. music or soundtracks, and without requiring any specific prior knowledge of specific characteristics of the rendered sound.

The position estimation is based on the generation of a correlated signal component and an uncorrelated signal component for the signals of the first and second speakers 101, 103. These signals are then compared to the captured sound by the microphone and the result is used to determine the position of the microphone.

A correlated signal component corresponds to signal components that are common to the two channels/speakers 101, 103 whereas uncorrelated signal components correspond to signal components that are not common to the two channels/speakers 101, 103.

The position estimation unit is arranged to correlate the received microphone signal with at least one correlated signal and at least one uncorrelated signal, and to estimate the position of the microphone 107 based on these at least two correlations. The approach thus utilizes correlations with at least two different signals that are derived from the sound signals that are rendered. The two correlations provide different advantages that can be combined in the position determination. Specifically, the correlation based on the common/correlated signal components of the rendered sound tends to often have a high signal to noise energy thereby allowing accurate estimation. However, as the correlation is based on common signal components, the differentiation and separation between the sound from the two channels/first and second speakers 101, 103 is not readily achievable, i.e. it may not be feasible to determine the contributions from each of the two speakers 101, 103. In contrast, the correlation with the uncorrelated signal(s) will provide individual characteristics for one of the speakers 101, 103 but may often have reduced signal-to-noise ratio thereby leading to reduced accuracy. By combining the different approaches, the microphone position estimation can often provide the advantages of each of the correlations, and in many embodiments may lead to improved accuracy and reliability of the estimated position. For example, the correlation based on the uncorrelated signal component may be used to resolve the ambiguity between the two speakers 101, 103 in the correlation based on the correlated signal.

An approach may for example be based on the principle that a stereo audio signal can be decomposed into signals corresponding to signal components that are correlated and uncorrelated between the input stereo signals. Moreover, the correlated and uncorrelated signal components can be used in two different localization algorithms and the results of the two methods can be fused to find a location for the microphone based on the rendering from a generic stereo audio signal.

Figure 2:
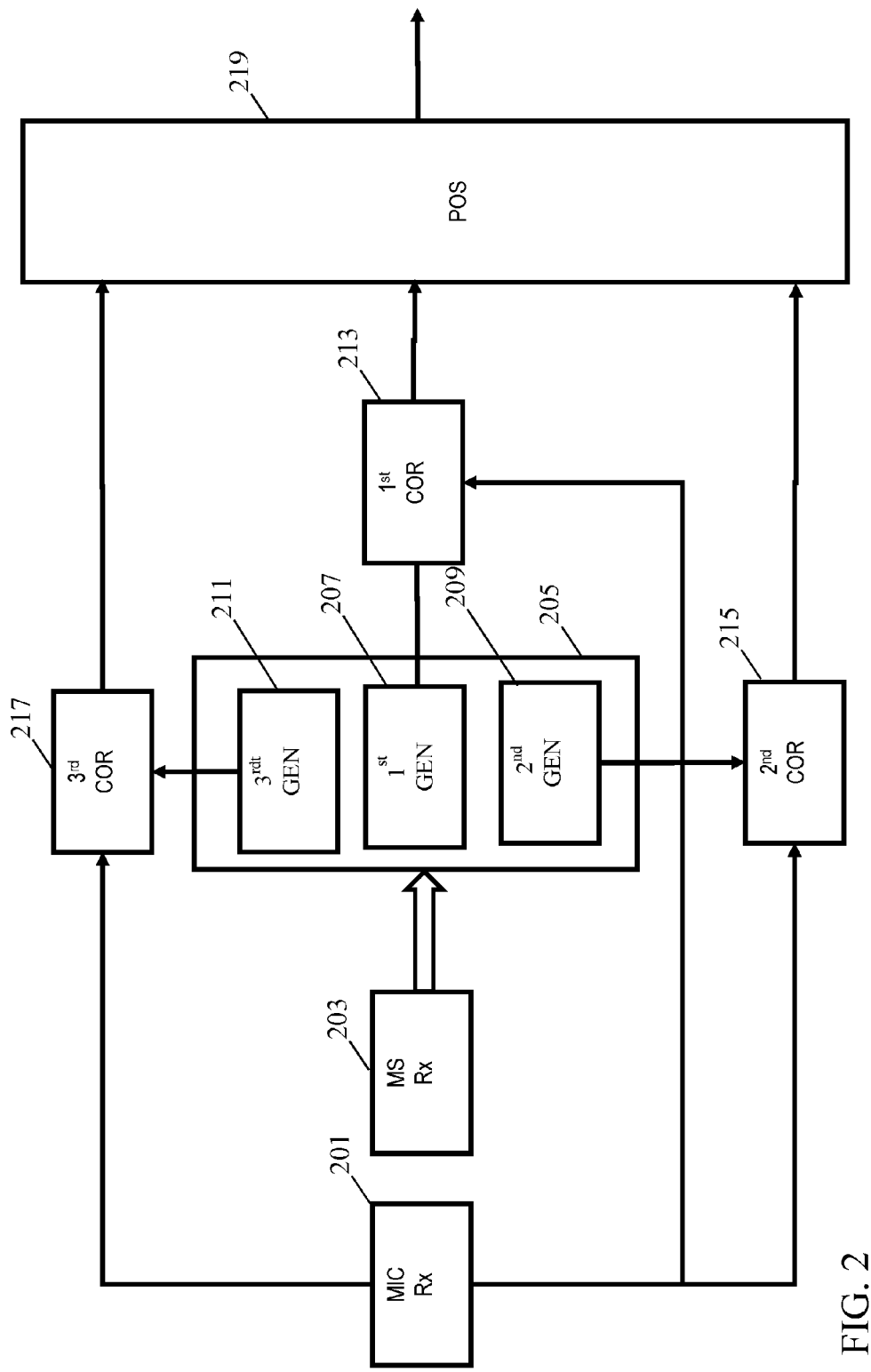
FIG. 2 is an illustration of position estimation unit for a sound rendering system in accordance with some embodiments of the invention.

FIG. 2 illustrates an example of elements of a position estimation unit which in the specific example is part of the audio renderer of FIG. 1.

The position estimation unit comprises a microphone receiver 201 or input which is arranged to receive a microphone signal from the microphone 107. In some embodiments, the microphone receiver 201 may be arranged to receive a plurality of microphone signals simultaneously. The following description will focus on the determination of a position estimate for one microphone based on the microphone signal from that microphone. However, it will be appreciated that in other embodiments the described processing may e.g. be performed simultaneously for a plurality of microphone signals to determine position estimates for a plurality of microphones.

The position estimation unit further comprises a multi-channel signal receiver 203 which receives a multichannel signal. The multichannel signal includes a first channel (signal) which is for rendering by the first speaker 101 which is positioned at a first position. The multichannel signal also includes a second channel (signal) which is for rendering by the second speaker 103 which is positioned at a second position.

The multi-channels signal may in some embodiments include other channels, such as channels for rear surround speakers etc. The following description focuses on the determination of a position estimate for the microphone 107 based on the first and second channels corresponding to front left and right (or conventional stereo) channels, but it will be appreciated that in other embodiments more or other channels may be considered. For example, for a five channel surround sound system the described approach may be used for some or each possible pairing of channels/speakers. A single position estimate may in some such embodiments be determined by combining the individual position estimates determined for different speaker pairs, e.g. by an averaging process.

In the example, the sound renderer 105 generates the drive signals for the first and second speakers 101, 103 and provides these to the multi-channel signal receiver 203. It will be appreciated that the signals corresponding to the first and second channels, and thus to the first and second speakers 101, 103, may be provided from anywhere in the signal paths, and may e.g. be filtered or otherwise modified representations of the rendered sound from the two speakers 101, 103. The signals of the first and second channel will for convenience be referred to as the input stereo signal, with the individual signals being referred to as the left input signal (corresponding to the signal for the first speaker 101) and the right input signal (corresponding to the signal for the second speaker 103).

The multi-channel signal receiver 203 is coupled to a decomposer 205 which is arranged to generate at least one signal that comprises correlated signal components of the first channel and the second channel (i.e. it comprises correlated signal components for the left and right input signals) and at least one signal which comprises uncorrelated signal components of the first channel and the second channel (i.e. it comprises uncorrelated signal components for the left and right input signals). The signal(s) comprising correlated signal components is (are) referred to as a correlated signal(s) and the signal(s) comprising uncorrelated signal components is (are) referred to as an uncorrelated signal(s).

In the specific example, the decomposer 205 comprises a first signal generator 207 which generates a correlated signal that comprises common signal components for the left and right input signals. The decomposer 205 further comprises a second signal generator 209 which generates a first uncorrelated signal corresponding to signal components of the left input signal that are not common with signal components of the right input signal. The first uncorrelated signal is referred to as the left uncorrelated signal. In the example, the decomposer 205 also comprises a third signal generator 211 which generates a second uncorrelated signal corresponding to signal components of the right input signal that are not common with signal components of the left input signal. The second uncorrelated signal is referred to as the right uncorrelated signal.

The input stereo signal may be denoted as $x_l(n)$, $x_r(n)$ and is in the example decomposed into a correlated signal $c(n)$ and a left and right uncorrelated signal $u_l(n)$, $u_r(n)$, where $$x_l(n) \cong c(n) + u_l(n);\ x_r(n) \cong c(n) + u_r(n)$$

and the cross-correlation functions for a sufficiently long observation window yields:

$$R_{uu} = E[u_l(n), u_r(n)] \cong 0.$$

In a simple embodiment the decomposition can be performed by segmenting the signal in time to correlated and uncorrelated parts. When in a short observation window the two signals have a low (normalized) cross-correlation coefficient (e.g., below 0.6), the signal is separated as a uncorrelated signal. When the normalized cross-correlation between the two signals is above a certain pre-defined threshold (e.g., 0.9), the stereo signal is segmented as a correlated signal. In this case the decomposition of the original stereo signal consists of alteration of uncorrelated and correlated and mildly correlated segments (between 0.6 and 0.9) which are omitted. The threshold values are just examples.

In some embodiments, the decomposition may be such that the sum of the correlated signal and the uncorrelated signal for one channel is identical to the input signal for that channel, i.e.

$$x_l(n) = c(n) + u_l(n);\ x_r(n) = c(n) + u_r(n)$$

However, in other embodiments, the equations may only hold approximately. Thus in some embodiments:

$x_l(n)=c(n)+u_l(n)+e_l(n); x_r(n)=c(n)+u_r(n)+e_r(n)$ where e(n), e_r(n) may be considered decomposition errors or deviations, e.g. in the example above those signals would represent the mildly correlated segments. Typically, the decomposition errors or deviations will be relatively small, say with an average power not exceeding 10% of the average power of the corresponding input signal.

The first generator 207 is coupled to a first correlator 213 which receives the uncorrelated signal. The first correlator 213 is furthermore coupled to the microphone receiver 201 from which it receives the microphone signal. The first correlator 213 is arranged to generate a first correlation signal in response to a correlation between the uncorrelated signal and the microphone signal. The correlation signal may specifically be given as the cross-correlation function:

$$y_1(t)=\int_{-T}^{T} c(\tau)\cdot m(t+\tau)d\tau$$

where T is a suitable is a suitable design parameter and is indicative of a time interval which the correlation signal is determined, and m(t) is the microphone signal.

In many embodiments, digital representations of the signals may be used and accordingly the time discrete cross-correlation may be used:

$$y_1(n) = \sum_{m=-M}^{M} c(m)\cdot m(n+m)$$

where M is a suitable design parameter and is indicative of a time interval which the correlation signal is determined.

The first correlation signal may thus be a signal which for a given time value is indicative of how similar the microphone signal and the first correlated signal are with a relative time offset corresponding to the given time value.

The first correlation signal thus reflects a (cross) correlation between the microphone signal and the common sound which is rendered from both speakers 101, 103. The first correlation signal may be considered as the impulse response of the acoustic transfer function from the speakers 103, 105 to the microphone. As the first correlated signal corresponds to the common signal components, i.e. to sound being rendered from both of the speakers 101, 103, the first correlation signal may specifically be considered to correspond to the summation of the acoustic transfer functions from respectively the first speaker 101 and the second speaker 103.

The acoustic transfer function representing sound propagation from a speaker to a microphone reflects the paths along which the sound may reach the microphone. Specifically, the acoustic transfer function is typically made up by a direct path component, an early reflection component, and a reverberation or diffuse component. The direct path component corresponds to sound that propagates directly from the loudspeaker to the microphone without any reflections. The early reflection component corresponds to initial reflected sounds that arrive at the microphone via typically no more than a few reflections. The reverberation or diffuse part corresponds to sound that reaches the microphone via a relatively high number of reflections such that the individual contributions can no longer be differentiated.

The acoustic transfer function accordingly comprises information that relates to the geometric setup, and which specifically is dependent on the position of the microphone with respect to the speaker. Indeed, the direct component corresponds to a direct propagation and the propagation time for the direct component accordingly defines the propagation time along the shortest path between the speaker and the microphone. The propagation time for the direct component thus corresponds to the distance between the microphone and the speaker. As the speed of sound is known relatively accurately, the distance can be determined directly from knowledge of the propagation delay.

Thus, the determined correlation signal comprises information related to the propagation of sound from the speakers 101, 103 to the microphone 107 and accordingly information relating to the distance from the speakers 101, 103 to the microphone 107.

However, as the first correlated signal comprises signal components that are rendered from both speakers 101, 103, the information relating to each of the two speakers 101, 103 is combined and it may not be possible to differentiate between the two. For example, even if the distances to both speakers 101, 103 are estimated from the first correlation signal, it is not known which of the distances relate to which speaker. Thus, it is not possible to differentiate between positions which are symmetric around the plane of equal distance to the loudspeakers 101, 103.

Figure 3:
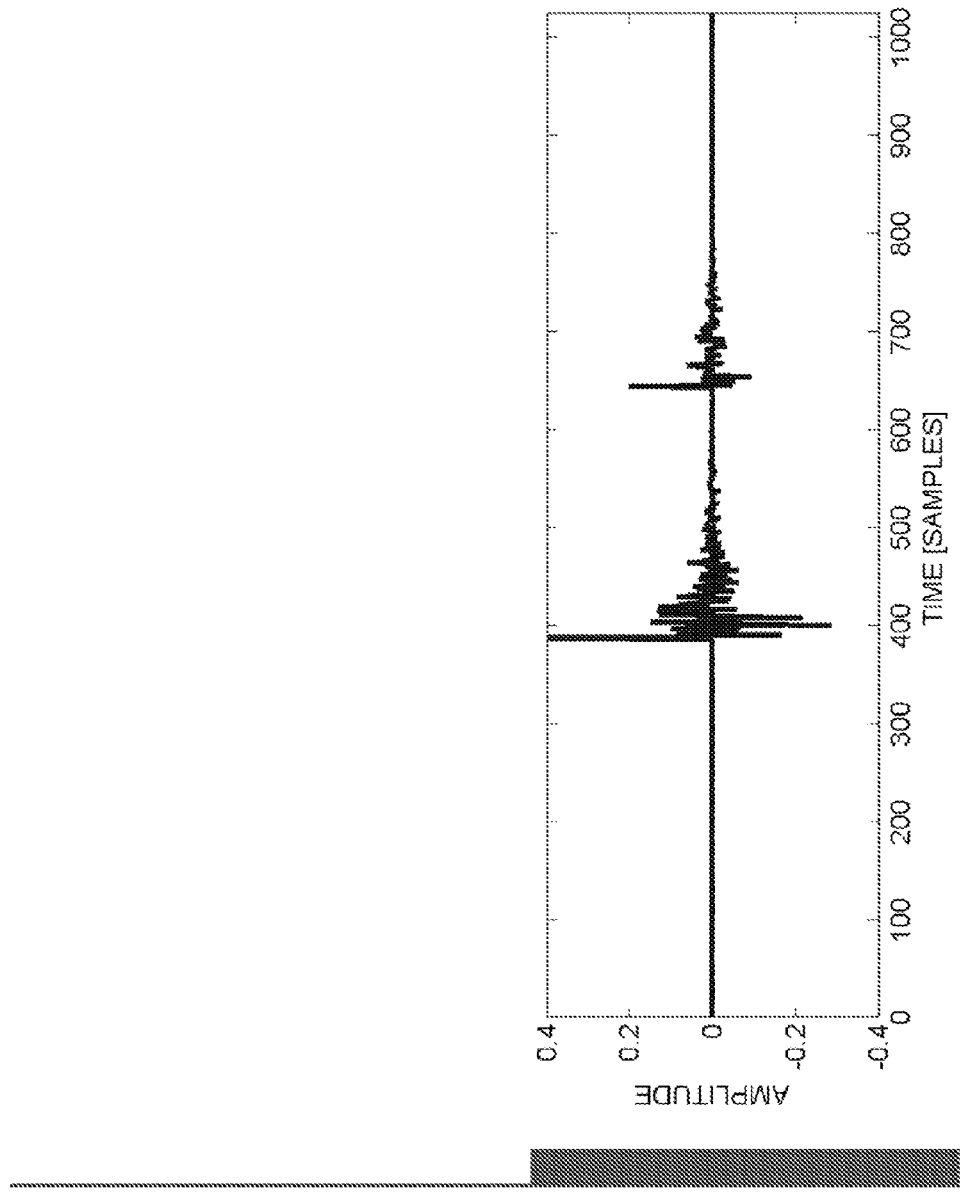
FIG. 3 illustrates an example of a cross-correlation signal that may be calculated by the position estimation unit of FIG. 2.

FIG. 3 illustrates an example of the cross correlation between the correlated signal and a microphone signal generated by the first correlator 213 where the microphone 107 is at a position corresponding to position A of FIG. 1. As illustrated, the cross correlation comprises two main intervals of activity. One of these corresponds to the sound from the first speaker 101 and the other corresponds to the sound from the second speaker 103. Thus, one section corresponds to the impulse response of the acoustic transfer function from the first speaker 101 to the microphone 107, and the other section corresponds to the impulse response of the acoustic transfer function from the second speaker 103 to the microphone 107. However, it is not possible to determine from the cross-correlation signal which section corresponds to which speaker. It is also noted that each section provides an indication of the impulse response, i.e. the effect of the direct path, the early reflections and the reverberations. The timing of the direct path may be determined from a timing of the start of the detected impulse response(s).

Due to the uncertainty over which speaker gives rise to which impulse response, there is an inherent ambiguity of the position information which can be derived from the cross-correlation signal of FIG. 3. Furthermore, in the example of FIG. 3, the contributions from the different impulse responses are separated in time and are easy to distinguish. However, for positions closer to being equidistant from the two speakers 101, 103, the impulse responses will overlap and it may be substantially more difficult, and possibly impossible, to separate the individual contributions. Furthermore, although audio will typically have strong correlated components for different spatial channels (especially for stereo signals or front channels of a surround system) this may not always be the case. Indeed, for some audio, the signals may be strongly decorrelated resulting in low levels of the correlated signal, and thus a relatively low signal-to-noise ratio of the generated cross-correlation signal.

Thus, although the generated cross-correlation signal may have properties which depend on the position of the microphone 107 relative to the speakers 101, 103, the information may in some scenarios be difficult to exploit in determining the position of the microphone 107.

In the example of FIG. 2, the position estimation unit further comprises a second correlator 215 coupled to the second generator 209. The second correlator 215 receives the first (or left) uncorrelated signal from the second generator 209, i.e. it receives the uncorrelated signal comprising signal components of the left input signal that are not common with signal components of the right input signal. The second correlator 215 then proceeds to generate a second correlation signal, also referred to as the left correlation signal, as the cross-correlation between the microphone signal and the left uncorrelated signal. The second correlator 215 may perform the same operation as that of the first correlator 213 except that it uses the left uncorrelated signal rather than the correlated signal for the correlation with the microphone signal.

Thus, specifically the second correlator 215 may generate the signal:

$$y_2(t) = \int_{-T}^{T} u_l(\tau) \cdot m(t+\tau) d\tau$$

or the time discrete cross-correlation version:

$$y_2(n) = \sum_{m=-M}^{M} u_l(m) \cdot m(n+m)$$

Thus, the second correlator 215 generates a second cross-correlation signal. However, this cross-correlation signal is based on sound that is rendered from only the left speaker 101, and as such reflects only the acoustic transfer function from the left speaker 101 to the microphone 107.

In the example of FIG. 2, the position estimation unit further comprises a third correlator 217 coupled to the third generator 211. The third correlator 217 receives the second (or right) uncorrelated signal from the third generator 211, i.e. it receives the uncorrelated signal comprising signal components of the right input signal that are not common with signal components of the left input signal. The third correlator 217 then proceeds to generate a third correlation signal, also referred to as the right correlation signal, as the cross-correlation between the microphone signal and the right uncorrelated signal. The third correlator 217 may perform the same operation as that of the first correlator 213 and the second correlator 217 except that it uses the right uncorrelated signal rather than the correlated signal or the left uncorrelated signal for the correlation with the microphone signal.

Thus, specifically the third correlator 217 may generate the signal:

$$y_3(t) = \int_{-T}^{T} u_r(\tau) \cdot m(t+\tau) c\tau$$

or in the time discrete cross-correlation version:

$$y_3(n) = \sum_{m=-M}^{M} u_r(m) \cdot m(n+m)$$

Thus, the third correlator 217 generates a third cross-correlation signal. However, this cross-correlation signal is based on sound that is rendered from only the right speaker 103 and as such reflects only the acoustic transfer function from the right speaker 103 to the microphone 107.

Figure 4:
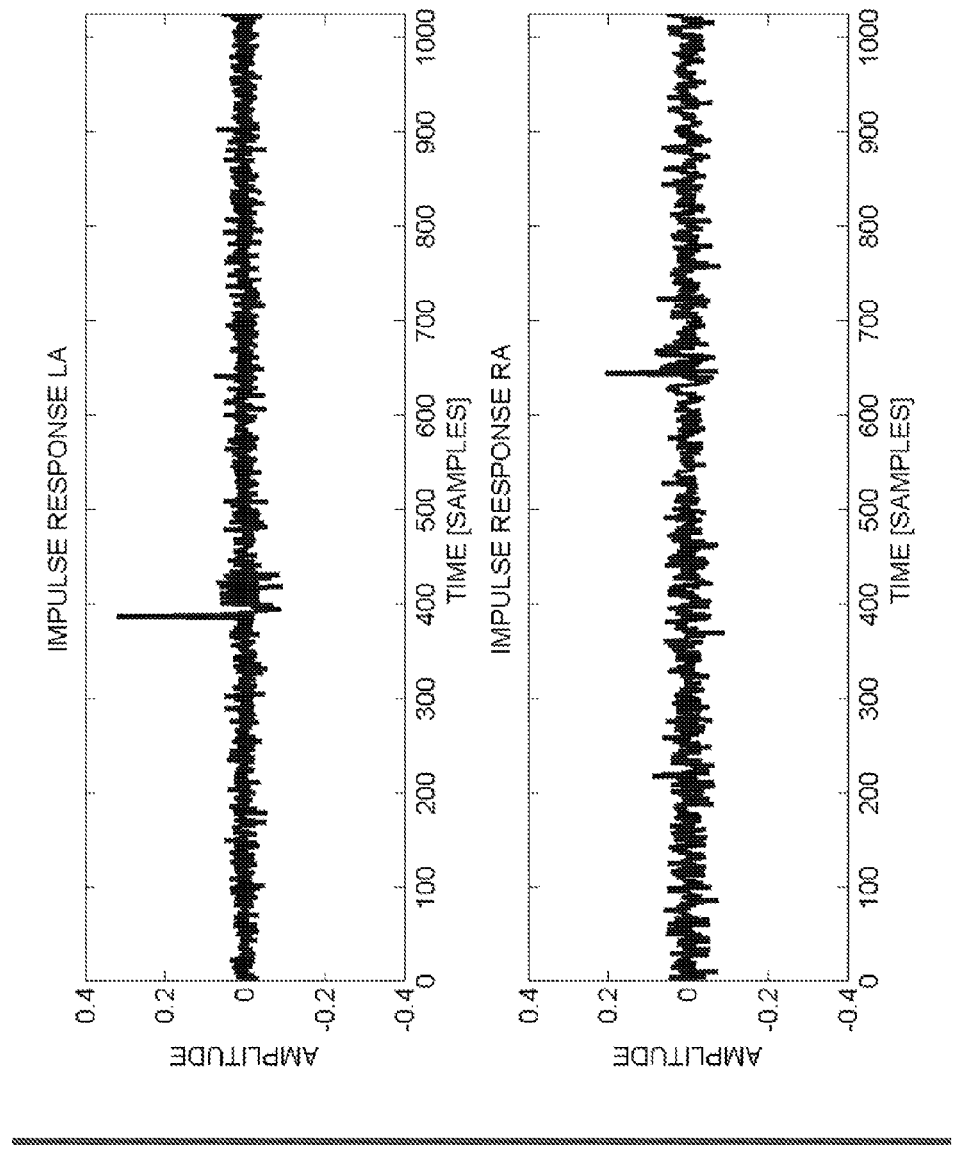
FIG. 4 illustrates examples of cross-correlation signals that may be calculated by the position estimation unit of FIG. 2.

FIG. 4 illustrates examples of the second correlation signal (referenced LA) and the third correlation signals (referenced LB) for the example where the microphone 107 is at a position corresponding to position A of FIG. 1.

As illustrated, each correlation signal only comprises one region with significant amplitude. This is due to each of these correlation signals being determined based on sound which is predominantly rendered from only one of the first and second speakers 101, 103. Thus, each correlation signal will correspond to the impulse response of only one of the acoustic transfer functions, i.e. to either the acoustic transfer function from the first speaker 101 to the microphone 107 or from the second speaker 103 to the microphone 107.

However, as also illustrated in FIG. 4, the uncorrelated sounds typically have lower power levels than the correlated sounds and accordingly the signal-to-noise ratios of the corresponding correlation signals tend to be lower than for the correlated signal. Therefore, the determination of a microphone position based only on the second and third correlation signals will tend to often be less accurate and reliable than desired.

In the position estimation unit of FIG. 2, the first correlator 213, the second correlator 215 and the third correlator 217 are all connected to a position estimator 219 which is fed the three correlation signals. The position estimator 219 is arranged to estimate the position of the microphone 107 in response to the first correlation signal, the second correlation signal and optionally the third correlation signal.

In the system of FIG. 2, the position of the microphone 107 is thus not just estimated based on one of the correlations but based on both the correlation of the microphone signal with the correlated signal and with at least one of the uncorrelated signals, and often both.

The correlation signals comprise information of when the sound from the different speakers 101, 103 are received at the microphone 107 and thus provides information of how far the microphone is from the different speakers 101, 103. The information may be used in different ways in different embodiments to determine a position estimate.

For example, the position estimator 219 may determine arrival time estimates (or equivalently propagation delays) for sound from the speakers 101, 103 to the microphone and may then determine the positions from these estimates.

As a specific example, based on the first correlation signal, the position estimator 219 may determine a first and second arrival time estimate. For example, as illustrated in FIG. 2, the first correlation signal may correspond to combined impulse responses for the acoustic transfer function from the speakers 101, 103 to the microphone 107. The timing of the first direct path, and thus the first signal component of each impulse responses, provides a direct measure of the distance from the relevant speaker 101, 103 to the microphone 107.

The position estimator 219 may determine the arrival time estimates in response to a peak detection being applied to the first correlation signal. This peak detection may detect two local maxima in the first correlation signal. Often, the direct path can be assumed to provide the strongest signal component, and the local maximum can therefore be assumed to correspond to the direct path. Thus, the peak detection may detect the time offsets τ for which the correlation is highest in a given time interval. This time offset directly provides a measure of the propagation delay from a speaker 101, 103 to the microphone. Using the speed of sound, the distance can accordingly be calculated. If the distances to the speakers 101, 103 are known, the position for the microphone 107 can be determined. Indeed, the position can directly be given as the distance to the speakers 101, 103. It will be appreciated that the determination of an arrival time estimate, propagation delay or time of flight can be considered equivalent.

Based on only the first correlation signal, the two distances can be determined but it is not cannot be determined which distance relates to the first speaker 101 and which relates to the second speaker 103. Accordingly, the consideration based on the first correlation signal can only determine the microphone 107 as one of the positions given by these distances, and specifically cannot differentiate between two positions that are symmetric around the center line/plane of the speakers 101, 103 as these will have the same two speaker distances (but to different speakers).

However, this ambiguity can be resolved by considering one (or both) of the second correlation signal and the third correlation signal. For example, a peak detection can be performed on the second (left) correlation signal to detect the maximum within a given time interval that includes both time instants of the detected peaks in the first correlation signal. The timing of the peak is then compared to the time instants of the peaks in the first correlation signal. The position estimator 219 may then assign the peak detections of the first correlation signal to the left speaker 101 and right speaker 103 respectively based on the timing of the peak in the second correlation signal. Specifically, the peak of the first correlation signal closest to the peak of the second correlation signal can be assigned to the first (left) speaker 101 and the other peak to the second (right) speaker.

It will be appreciated that in some embodiments, the assignment of the peaks of the first correlation signal to the respective ones of the speakers 101, 103 may be based on both the second correlation signal and the third correlation signal. For example, distance measures may be determined for the timings of each of the peaks of the first correlation signal to each of the peaks of the second correlation signal and the third correlation signal. The combined distance estimate for each assignment of the peaks of the first correlation signal to the corresponding peaks of the second correlation signal and the third correlation signal can then be determined, and the assignment resulting in the lowest overall distance measure can be selected.

It will also be appreciated that the time of arrival/propagation delay/time of flight estimates need not be based on peak detections. For example, in some embodiments, the timings may be determined for the first signal component above e.g. a given threshold (which may be signal dependent). Such an approach may for example allow the direct path component to be detected even if it is not the strongest signal component (e.g. if a reflection is stronger due to acoustic attenuation along the direct path).

Thus, in some embodiments, the position estimation may be based on time-differences-of-arrival for the two sounds from the first speaker 101 and the second speaker 103 or on absolute time-of-flight times for the sound propagating from the speakers 101, 103 to the microphone 107. The latter option may specifically be used if the system is time-synchronized. For simplicity, the following description focuses on the synchronized case where the relative time of playback and capturing is known.

The specific approach estimates the time-of-flight by determining the cross correlation function between the playback signal from the speakers 101, 103 and the capture signal, i.e. the microphone signal. It then determines the time position corresponding to the largest value of the cross-correlation function.

Various algorithms for the estimation of the time difference between two signals can be used. For example, techniques based on computation of various types of normalized or generalized cross-correlation coefficients based on time- or frequency domain representations of the signals are known. As another example, formulations of adaptive filtering techniques, such as Normalized Least Mean Square or frequency-domain adaptive filters, are known and may provide indications of time differences between signals.

In the following, the generic operator $TD[s_1(n),s_2(n)]$ may be used to represent the time-difference between any two signals $s_1(n)$ and $s_2(n)$. The captured microphone signal is denoted by $m(n)$. Considering the microphone 107 at position A in FIG. 2, the path lengths LA and RA can be obtained by using the left and right uncorrelated signals such that $$LA = TD[u_l(n), y(n)]p$$

$$RA = TD[u_r(n), y(n)]p$$

where $p=c/f_s$, and c is the speed of sound in air and $f_s$ is the sampling frequency of the digital audio data in the system.

In the example, the acoustic impulse response from the loudspeakers 101, 103 to the microphone 107 are generated by the specific cross-correlation, corresponding to the impulse responses of FIG. 4. The responses contain a relatively high degree of noise because the received microphone signal contains the signals from both loudspeakers, i.e. the audio rendered from the first speaker 101 will introduce noise to the cross-correlation for the second speaker 103 and vice versa. However, the peak corresponding to the direct paths LA and RA, can be clearly identified in the responses. The TD operation can specifically provide the time delay corresponding to the position of the maximum peak in the impulse response.

The location of microphone A in a plane in front of the loudspeakers L and R can be directly determined from the two distance measures LA and RA using trigonometry and with knowledge of the distance between the two loudspeakers 101, 103 (which we assume known or estimated using acoustic or other measurements.)

The approach of using only the two uncorrelated signals may provide reasonable results for some audio signals where the audio rendered from the two speakers 101, 103 are substantially decorrelated. However, as the amount of common and correlated audio increases, the determined impulse responses become increasing noisy for the given signal energy. Accordingly, the system may use the information provided by considering the first correlation signal, i.e. the correlation with the correlated signal components for the two speakers 101, 103. Although this signal corresponds to the combination of the impulse responses, it may provide a much less noisy signal (as illustrated in FIG. 3) and may accordingly allow a substantially more accurate determination of the timings, and thus of the arrival times (or equivalently the time of flight) estimates. Therefore, the position estimator 219 may proceed to also determine the two arrival time estimates from the first correlation signal.

The different arrival time estimates may then be combined. For example, a pairing between the arrival time estimates of the first correlation signal and the arrival time estimates of the second correlation signal and the third correlation signal may be performed, e.g. simply pairing the time estimates closest to each other. For each pair of time estimates, the combined time estimate may be calculated e.g. by a (possibly weighted) averaging of the time estimates of the pair. The two resulting time estimates then correspond to the time of flight estimates from each of the speakers 101, 103 to the microphone 107, and accordingly the distances and thus the position of the microphone 107 can be determined.

The detection of the direct path components (specifically the peak detection) for one correlation signal may be based on the characteristics of one of the other correlation signals. Specifically, the detection of the peak in the first correlation signal may be dependent on the second correlation signal or the third correlation signal.

For example, peak detection may first be performed on the second correlation signal leading to an estimated time instant for the peak/direct path. In the ideal scenario, the timing of the direct path for the first speaker 101 should occur at the same time instant for the first correlation signal. However, due to noise there may be some deviations. However, the time estimate determined from the second correlation signal may be used as a guide for the peak detection of first correlation signal. For example, the peak detection for the first correlation signal may be performed within a given time window centered around the timing of the peak in the second correlation signal.

In other embodiments, more complex approaches may e.g. be used and indeed the position estimate may be generated as a more complex estimate, such as e.g. a probability distribution or map representing the probability of the microphone 107 being at different positions.

Specifically, in some embodiments, the position estimator 219 may be arranged to determine the probability of the position of the microphone 107 being in a given region based on the first correlation signal and the second correlation signal, as well as typically the third correlation signal.

The probability may be determined by considering the correlation signals in time intervals that correspond to the region. For example, one or more propagation delays from the first speaker 101 to the region may be calculated assuming a direct path. For example, the minimum and maximum distance from the first speaker 101 may be determined, and the corresponding minimum propagation delay and maximum propagation delay can be determined. An interval for the first correlation signal and the second correlation signal corresponding to the possible propagation delays (i.e. the interval may be from the minimum propagation delay to the maximum propagation delay may be calculated) can thus be determined.

A property of the first correlation signal may then be considered in this interval. For example, the property may be a timing of a peak and the probability may be determined depending on whether a detected position of a peak falls within the interval. As another example, the property considered may be a maximum signal level of the first correlation signal within the interval. If the microphone 107 is within the given interval, it is likely that the maximum signal level within the interval is higher than outside the time interval, i.e. it is likely to be higher for this region than for other regions. As another example, the accumulated or average signal level in the interval may be determined (or equivalently the signal energy in the time interval may be determined). The signal level is likely to be higher if the microphone 107 is positioned within the region than if not.

The same properties may be evaluated for the second correlation signal and the third correlation signal.

Time intervals for the region may be determined for both the first and the second speaker 101, 103. For the first correlation signal, the signal is evaluated in both time intervals, for the second correlation signal the signal is evaluated in the time interval for the first speaker 101, and for the third correlation signal, the signal is evaluated time interval for the second speaker 103.

The resulting values may then be combined. As a low complexity example, the probability indication for the region (i.e. the value indicating the likelihood that the microphone 107 is within the region) may be determined simply to reflect how many of the calculated time of arrival estimates fall within the determined time intervals. Thus, if all the calculated arrival time estimates fall within the relevant time intervals for the region, there is a high probability that the microphone 107 is positioned within the region.

In more advanced embodiments, the position estimator 219 may e.g. combine the values for each of the time intervals and signals. For example, the maximum signal levels of the first correlation signal in the two time intervals as well as the maximum signal levels of the first correlation signal and second correlation signal in the appropriate time intervals may be added together to generate a value which is indicative of the probability of the position of the microphone 107 being within the region. It will be appreciated that normalization with respect to e.g. the signal energies and/or values determined for other regions may be performed in many embodiments.

The approach may be repeated for other regions. Specifically, the area (or volume) may be divided into regions, and the approach may be performed for each region, thereby building up a map of probabilities that the position of the microphone 107 is in each individual region. The position estimate may be provided in the form of this map or further processing may be performed to determine a single position estimate for the microphone 107, e.g. by selecting the center point of the region which yields the highest probability.

Figure 5:
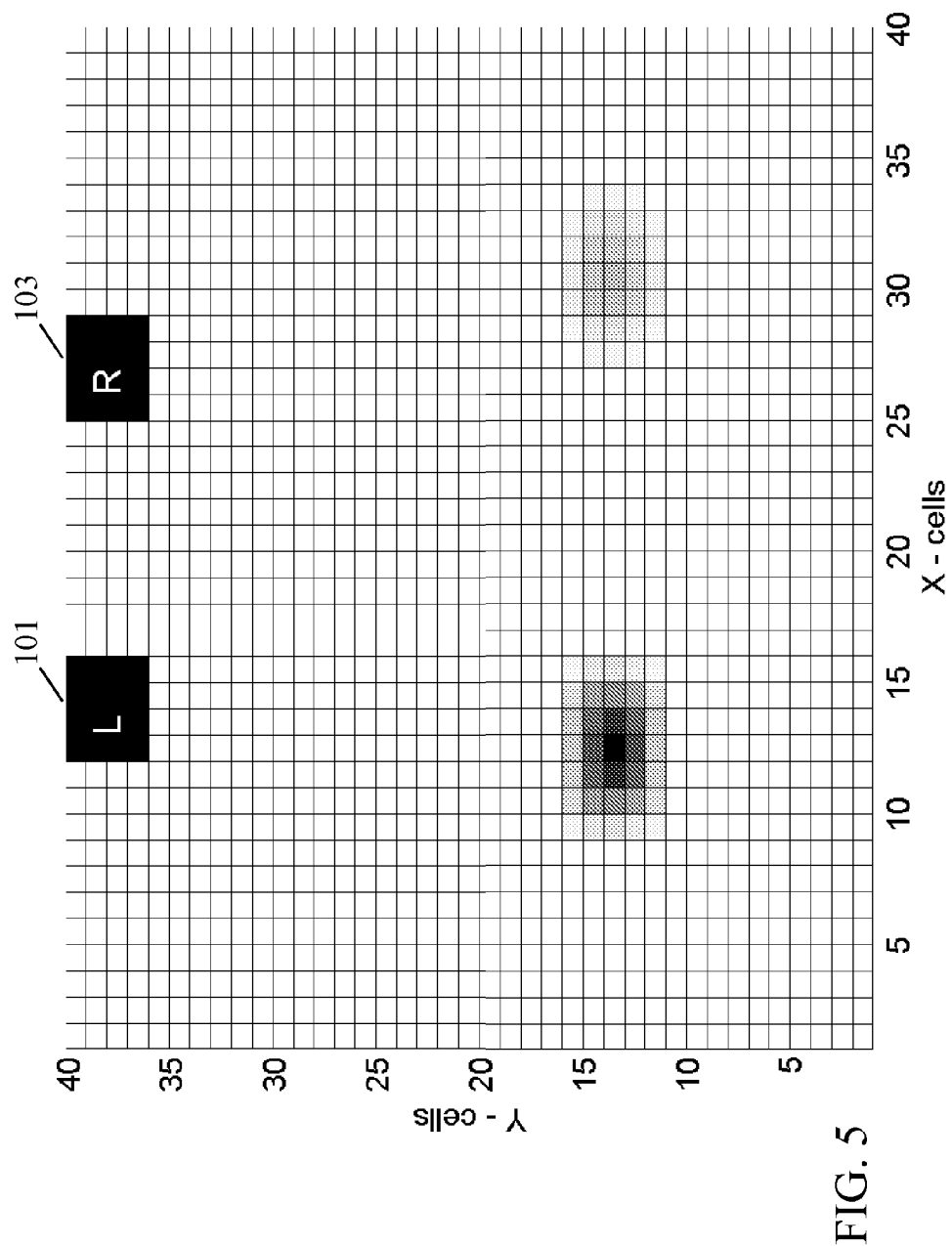
FIG. 5 illustrates an example of a position probability map.

As a specific example, FIG. 5 illustrates an example of a map of the area in front of the two loudspeakers 101, 103. The area in front of the loudspeakers 101, 103 is divided into a grid. In the specific example, the division is into a 40×40 grid of cells which are positions in a plane. For example, each cell could be 20 cm×20 cm in the real world.

Each (x,y)-cell is associated with a likelihood $L(x,y)$, which represents a likelihood that the microphone 107 is in the cell/region. The indications determined from the different correlation signals are accumulated and used to modify the $L(x,y)$ cell likelihood variable. For example:

$$L(x,y)=g*L(x,y)+(1-g)(I_1+I_2+I_3+I_4),$$

where $I_1$ is the maximum signal value of the first correlation signal in the first time interval for cell/region (x,y), $I_2$ is the maximum signal value of the first correlation signal in the second time interval, $I_3$ is the maximum signal value of the second correlation signal in the first time interval, $I_4$ is the maximum signal value of the third correlation signal in the second time interval, g is a design parameter (e.g, g=0.9) and each of the values for I are normalized to the interval [0; 0.25].

FIG. 5 shows a possible outcome after some time of stereo audio playback (where a darker color indicates a higher probability). The maximum likelihood is found at and around position (13,14) (dark color) which suggests that this is the microphone position. There is also some increased likelihood in position (31,14) which is due to the ambiguities for the first correlation signal. However, the combination with the information for the second correlation signal and the third correlation signal clearly results in the highest (darkest) probability being for position (13,14). The position of the microphone 107 may simply be determined by finding the cell which has the highest likelihood $L(x,y)$.

The method based on the map described above can also utilize additional information about the environment. In some embodiments it is possible that the floor plan including the positions of the walls and possibly furniture can be used to control the location estimation. It is also possible to use the usage history of the system to give a larger weight to locations that have been found in the past.

As previously mentioned, different approaches for generating the correlated signal and the uncorrelated signal(s)

may be used in different embodiments. In the following, a specific example will be described.

Figure 6:
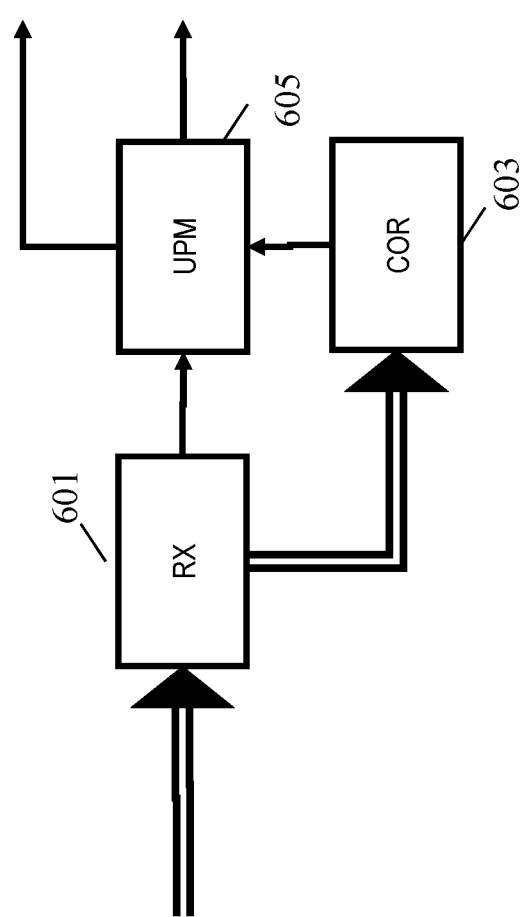
FIG. 6 illustrates an example of elements of a signal decomposer of the position estimation unit of FIG. 2.

In the example, the decomposer 205 is arranged to generate the correlated and uncorrelated signals based on an evaluation of the correlation of the input stereo channels. Specifically, a correlation measure which is indicative of the correlation between the input stereo channels is used by the decomposer 205 to synthesize the correlated and uncorrelated signals. An example of elements of such a decomposer 205 is illustrated in FIG. 6. The following example will describe how a correlated and uncorrelated signal is generated from the first (left) input signal.

The decomposer 205 of FIG. 6 comprises a receiver 601 which receives the input stereo signal. The decomposer 205 further comprises a correlation estimator 603 which is arranged to generate a correlation measure for the input stereo signal. The receiver 601 and the correlation estimator 603 are coupled to an upmixer 605 which is fed the first (left) input signal from the receiver 601 and which proceeds to upmix this signal to generate two corresponding signals, namely a correlated and uncorrelated signal.

In the example of FIG. 6, the correlation estimator 603 is arranged to generate the correlation measure by performing a direct correlation. The correlation measure may comprise a specific correlation value for each of a plurality of time frequency intervals, also referred to as time-frequency tiles. Indeed, the upmixing of the first input signal may be performed in time-frequency tiles and the correlation measure may provide a correlation value for each time-frequency tile.

In some embodiments, the resolution of the correlation measure may be lower than that of the time-frequency tiles of the upmixing. For example, a correlation value may be provided for each of a number of perceptual significance bands, such as for each of a number of ERB bands. Each perceptual significance band may cover a plurality of time-frequency tiles.

The correlation measure may be fed to the upmixer 605 which can proceed to determine gains for respectively the correlated and the uncorrelated signal. Specifically, the input signal may be segmented and converted to the frequency domain. For each frequency domain value (FFT bin value) in the time segment (i.e. for each time frequency tile), the upmixer 605 may generate a correlated signal value by multiplying it by a gain derived from the correlation value for the corresponding time-frequency tile. The gain may increase for increasing correlation. As a result a frequency domain signal is generated that comprises a high weighting of the correlated components of the input signal.

Similarly, for each frequency domain value (FFT bin value) in the time segment (i.e. for each time frequency tile), the upmixer 605 may generate an uncorrelated signal value by multiplying it by a gain derived from the correlation value for the corresponding time-frequency tile. The gain may decrease for increasing correlation. As a result a frequency domain signal is generated that comprises a low weighting of the correlated components of the input signal, and accordingly a high weighting of the uncorrelated signal components.

The two generated frequency signals may then be converted back to the time domain to provide the correlated and uncorrelated signals, or may be provided in the frequency domain for further processing in the frequency domain.

The upmixer 605 may specifically determine the gains to exactly or approximately maintain the overall energy level of the signals (specifically the sum, or the sum of the square, of the gains may be set to one). The upmixer 605 may furthermore be arranged to provide a frequency domain smoothing of the gains which may improve the perceived sound quality.

In more detail, the first input signal may be given by the short-time input signal vector $$x(n)=[x(n),x(n-1),\ldots,x(n-K+1)]^T$$

or the spectrum vector obtained using the discrete Fourier transform:

$$X(n,\omega)=\mathcal{F}wx(n)$$

where $\mathcal{F}$ a matrix of Fourier basis functions and the window function w is a diagonal matrix of, e.g., Hanning window function coefficients on the diagonal and zero elsewhere.

In the specific example, both the left and the right input signals are upmixed and thus the upmixing is applied to a stereo signal $$X(n,\omega)=[X_1(n,\omega),X_2(n,\omega)]$$

The upmixing of such a stereo vector signal to an M-channel vector signal:

$$Y(n,\omega)=[\ddot{Y}_0(n,\omega),\ldots,\ddot{Y}_{M-1}(n,\omega)]$$

can be performed separately for each transform component. For the $\omega^{th}$ frequency component, the upmixed vector signal is given by $$Y(n,\omega)=G(n,\omega)X(n,\omega)$$

where $G(n,\omega)$ is a matrix operation.

The filter matrix can in the specific example be written in the following form:

$$G(n,\omega)=\begin{bmatrix} g_{11}(n,\omega) & 0 \\ 0 & g_{22}(n,\omega) \\ g_{31}(n,\omega) & 0 \\ 0 & g_{42}(n,\omega) \end{bmatrix}.$$

This matrix does not mix left and right channels (zeroes in the matrix).

The gains of the matrix are determined from the correlation measure.

Furthermore, the weights for the correlated signals (i.e. $g_{11}$ and $g_{31}$) are determined as monotonically increasing functions of the correlation measure (and specifically of the correlation value in that time frequency tile). Thus, the allocation of the signal energy of a specific time frequency tile into the correlated signal increases the more the two spatial channels are correlated. It will be appreciated that the gains may also depend on other parameters and considerations but that the relationship to the correlation value will be monotonically increasing.

The weights for the uncorrelated signals (i.e. $g_{22}$ and $g_{42}$) are determined as monotonically decreasing functions of the correlation measure (and specifically of the correlation value in that time frequency tile). Thus, the allocation of the signal energy of a specific time frequency tile into the background signal increases the less the two spatial channels are correlated, i.e. the more it corresponds to diffuse sound. It will be appreciated that the gains may also depend on other parameters and considerations but that the relationship to the correlation value will be monotonically decreasing.

Thus, the decomposer 205 decomposes the input stereo signals into signal components that are correlated and signal components that are not correlated.

The correlation estimator 603 determines the correlation values which in the specific example is between the two input stereo signals. For a two input data sequence the correlation coefficient can be defined as:

$$C = \frac{\langle X_1(n,\omega), X_2(n,\omega)\rangle}{\sqrt{\langle X_1(n,\omega), X_1(n,\omega)\rangle^2 \langle X_2(n,\omega), X_2(n,\omega)\rangle^2}},$$

where $\langle \ldots \rangle$ denotes the computation of an expected value of the inner product of the two data sets over the variable n. When the value of the correlation coefficient C approaches one, it may be said that the content is coherent in the two channels.

The signal power and the product of the two input channels can be obtained in each frequency bin as follows:

$$\phi_{ij}(n,\omega) = X_i(n,\omega)X_j(n,\omega)^* \; (i,j=1,2)$$

where * denotes the complex conjugate. Given these instantaneous quantities, a time direction filtering may be applied, e.g. using a first-order integrator with an adaptation parameter $\lambda 1$ resulting in a sliding-window estimate given by:

$$\phi_{ij}(n,\omega) = \lambda_1 \phi_{ij}(n,\omega) + (1-\lambda_1)\phi_{ij}(n-1,\omega)$$

The correlation value for each time-frequency tile may then be determined as:

$$C(n,\omega) = \frac{|\phi_{12}(n,\omega)|}{\sqrt{\phi_{11}(n,\omega)\phi_{22}(n,\omega)}}$$

An averaging may be applied to the generated correlation measures. E.g. an averaging process in the frequency direction may improve audio quality substantially in many scenarios.

Indeed, in the system of FIG. 6, the correlation estimator 603 is arranged to determine the correlation value for a given time frequency interval in response to a (weighted) frequency averaging of correlation values of a plurality of time frequency intervals. Thus, a spectral smoothing can be performed.

Accordingly, the correlation values may be determined as:

$$\tilde{w}(n,\omega) = S[w(n,\omega)],$$

where $S[.]$ indicates a suitable frequency smoothing function. For example, a triangular or square smoothing function may be applied. As a low complexity example, the smoothing function S may simply determine the average of the unsmoothed correlation value for the current time frequency tile and the N surrounding (in the frequency domain) unsmoothed correlation values.

The individual gain coefficients $$g_{kp}(n,\omega), k=1,2, p=1,\ldots,4$$

may then for example be determined as:

$$g_{11}(n,\omega) = g_{22}(n,\omega) = \tilde{w}(n,\omega)$$

$$g_{31}(n,\omega) = g_{42}(n,\omega) = 1 - \tilde{w}(n,\omega)$$

In some embodiments, other parameters or characteristics may be taken into account when determining the gains. Specifically, in the system of FIG. 6, the correlation estimator 603 may optionally determine the gain in response to an energy difference estimate for the channels.

In the specific example, a correlated signal and an uncorrelated signal is generated for each of the input stereo signals. Thus, in some embodiments, the input stereo signal $x_l(n)$, $x_r(n)$ can be decomposed into a pair of new stereo signals $c_l(n)$, $c_r(n)$ and $u_l(n)$, $u_r(n)$. In such examples, where the cross-correlation functions meet the following for sufficiently long intervals:

$$R_{cc} = E[c_l(n), c_r(n)] \to C \neq 0$$

$$R_{uu} = E[u_l(n), u_r(n)] \to 0$$

More details in the specific decomposition approach may be found in PCT/IB2013/050331.

In some embodiments, the position estimator 219 may weigh the first correlation signal relative to the second and third correlation signals when determining the position. Thus, the significance or impact on the position determination from respectively the correlated signal components and the uncorrelated signal components may be dynamically adjusted.

In some embodiments, the weighting may be a simple selection weighting. For example, if the rendered audio has a high concentration of correlated signal components and a low concentration of uncorrelated signal components, the position estimator 219 may simply select to determine the positions based on the first correlation signal. E.g. in this case, the time of arrival estimates may be determined as those corresponding to peaks in the first correlation signal. These timings may be used directly and may not be modified based on the second correlation signal or the third correlation signal. However, the results from the second correlation signal and/or the third correlation signal may be used to assign the two estimates to the respective speakers.

Conversely, if the rendered sound predominantly comprises uncorrelated signal components, the position estimator 219 may instead determine the position based on the properties of the second correlation signal and the third correlation signal. For example, the arrival time estimates determined from the second correlation signal and the third correlation signal may be used directly and the arrival time estimate determined from the first correlation signal may be ignored.

In many embodiments, a more gradual weighting is applied. For example, if a position probability indication is determined for a region based on the maximum signal value of the correlation signals in different time intervals corresponding to the region, the determined signal values may be combined in a weighted summation where the weights are adjusted dynamically. For example, when there is a high concentration of correlated sound, the maximum values of the first correlation signal are weighted high whereas if there is a high concentration of uncorrelated sound, the maximum values of the second correlation signal and the third correlation signal are weighted high.

As another example, the arrival time estimate from the first speaker 101 to the microphone 107 is in some embodiments determined both from a peak detection of the first correlation signal and from a peak detection of the second correlation signal. The resulting two arrival time estimates may be averaged in a weighted summation where the weight for each arrival time estimate may be adapted.

The adaptation of the weighting may in many embodiments be determined based on a power level of the first correlation signal relative to a power level of the second correlation signal. Indeed, if most of the rendered sound is correlated, the power level of the first correlation signal will be higher than that of the second correlation signal, whereas if most of the rendered sound is uncorrelated the power signal of the second correlation signal or third correlation signal will be higher than that of the first correlation signal. Alternatively or additionally, the adaption of the weighing may be based on a power level of the correlated signal relative to a power level of the uncorrelated signal. Thus, the weighting may be directly dependent on the relative power levels of the signals generated by the decomposer 205 from the input signals. These signals directly provide an estimate of the sound that is rendered as correlated and uncorrelated sound respectively. Furthermore, they are not dependent on acoustic or measurement noise which may in some scenarios allow an improved weighting.

It will be appreciated that in other embodiments other properties may be used to adapt the weighting. For example, the signal to noise ratio of the correlation signals may be determined and used to adapt the relative weighting of the different correlation signals in the position determination.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. An apparatus for determining a position of a microphone, the apparatus comprising:
   a multi-channel signal receiver for receiving a multichannel signal comprising at least a first channel for rendering by a first speaker at a first position and a second channel for rendering by a second speaker at a second position;
   a first signal generator for generating a first correlated signal from the multichannel signal, the first correlated signal comprising correlated signal components for the first channel and the second channel;
   a second signal generator for generating a first uncorrelated signal from the multichannel signal, the first uncorrelated signal comprising signal components of the first channel not correlated with signal components of the second channel;
   a microphone signal receiver for receiving a microphone signal from the microphone a first correlator for determining a first correlation signal from a correlation of the microphone signal and the first correlated signal;
   a second correlator for determining a second correlation signal from a correlation of the microphone signal and the first uncorrelated signal; and
   a position estimator for estimating the position of the microphone in response to the first correlation signal and the second correlation signal.

2. The apparatus of claim 1 further comprising:
   a third signal generator to generate a second uncorrelated signal from the multichannel signal, the second uncorrelated signal comprising signal components of the second channel not correlated with signal components of the first channel;
   a third correlator for determining a third correlation signal from a correlation of the microphone signal and the second uncorrelated signal; and
   wherein the position estimator is configured to estimate the position of the microphone further in response to the third correlation signal.

3. The apparatus of claim 1 wherein the position estimator comprises:
   a first estimator for generating a first arrival time estimate and a second arrival time estimate for sound from the first speaker and the second speaker to the microphone in response to the first correlation signal;
   a second estimator configured to generate a third arrival time estimate for sound from the first speaker to the microphone in response to the first uncorrelated signal; and
   wherein the position estimator is configured to estimate the position of the microphone in response to the first arrival time estimate, the second arrival time estimate and the third arrival time estimate.

4. The apparatus of claim 3 wherein the position estimator is configured to assign the first arrival time estimate to one of the first speaker and the second speaker in response to the third arrival time estimate.

5. The apparatus of claim 2 wherein the position estimator is configured to determine a combined arrival time estimate for sound of the first speaker from the third arrival time estimate and one of the first arrival time estimate and the second arrival time estimate, and to determine the position of the microphone to have a distance from the first speaker corresponding to the combined arrival time.

6. The apparatus of claim 5 wherein a relative weighting of the third arrival time and the one of the first arrival time estimate and the second arrival time estimate in generating the combined arrival time estimate depends on at least one of a correlation level estimate and a correlation noise estimate for at least one of the first correlation and the second correlation.

7. The apparatus of claim 3 wherein the first estimator is configured to detect a first peak and a second peak in the first correlation signal and to determine the first time of arrival estimate in response to a timing of the first peak and to determine the second time of arrival estimate in response to a timing of the second peak.

8. The apparatus of claim 3 wherein the first estimator is configured to perform a peak detection to detect a peak in the first correlation signal and to determine the first time of arrival estimate in response to a timing of the peak, wherein the peak detection is dependent on the second correlation signal.

9. The apparatus of claim 1 wherein the position estimator is configured to weigh the first correlation signal relative to the second correlation signal in response to at least one of: a power measure of the first correlation signal relative to a power measure of the second correlation signal; and a power measure for the first correlated signal relative to a measure level of the first uncorrelated signal.

10. The apparatus of claim 1 wherein the position estimator is configured to determine a probability of the position being in a region in response to at least one of a property of the first correlation signal in a first time interval and a property of the second correlation signal in a second time interval, the first and second time intervals corresponding to a sound propagation delay for sound from the first speaker to the region.

11. The apparatus of claim 10 wherein the property is a signal level measure.

12. The apparatus of claim 1 further comprising: a divider which is configured to divide a first channel signal of the first channel into a plurality of time-frequency intervals; a correlation estimator configured to generate a correlation measure for the first channel signal of the first channel and a second channel signal of the second channel for each time-frequency interval of the plurality of time-frequency intervals; and wherein the first signal generator is configured to generate the first correlated signal by for each time frequency interval weighting a signal value of the first channel signal for the time frequency interval by a weight being a monotonically increasing function of the correlation measure for the time-frequency interval.

13. The apparatus of claim 12 wherein the second signal generator is configured to generate the first uncorrelated signal by for each time frequency interval weighting a signal value of the first channel signal for the time frequency interval by a weight being a monotonically decreasing function of the correlation measure for the time-frequency interval.

14. A method of determining a position of a microphone, the method comprising: in an apparatus for determining a position of a microphone:
receiving via a multi-channel signal receiver, a multichannel signal comprising at least a first channel for rendering by a first speaker at a first position and a second channel for rendering by a second speaker at a second position;
generating via a first signal generator, a first correlated signal from the multichannel signal, the first correlated signal comprising correlated signal components for the first channel and the second channel;
generating via a second signal generator, a first uncorrelated signal from the multichannel signal, the first uncorrelated signal comprising signal components of the first channel not correlated with signal components of the second channel;
receiving a microphone signal from the microphone;
determining in a first correlator, a first correlation signal from a correlation of the microphone signal and the first correlated signal;
determining in a second correlator, a second correlation signal from a correlation of the microphone signal and the first uncorrelated signal; and
estimating in a position estimator, the position of the microphone in response to the first correlation signal and the second correlation signal.

15. A computer readable-readable storage media that is not a transitory propagating wave or signal, comprising computer program code adapted to perform a method of operating an apparatus for determining a position of a microphone, the method comprising the acts of:
in an apparatus for determining a position of a microphone:
receiving via a multi-channel signal receiver, a multichannel signal comprising at least a first channel for rendering by a first speaker at a first position and a second channel for rendering by a second speaker at a second position;
generating via a first signal generator, a first correlated signal from the multichannel signal, the first correlated signal comprising correlated signal components for the first channel and the second channel;
generating via a second signal generator, a first uncorrelated signal from the multichannel signal, the first uncorrelated signal comprising signal components of the first channel not correlated with signal components of the second channel;
receiving a microphone signal from the microphone;
determining in a first correlator, a first correlation signal from a correlation of the microphone signal and the first correlated signal;
determining in a second correlator, a second correlation signal from a correlation of the microphone signal and the first uncorrelated signal; and
estimating in a position estimator, the position of the microphone in response to the first correlation signal and the second correlation signal.

* * * * *